(12) United States Patent
Ljungmann (10) Patent No.: US 6,626,224 B1
(45) Date of Patent: Sep. 30, 2003

(54) MACHINE FOR AUTOMATICALLY ATTACHING COVER SLIPS TO MICROSCOPE SLIDES

(76) Inventor: Torstein Ljungmann, Geitmyrsvn. 5, 0171 Oslo (NO)

( * ) Notice: Subject to any disclaimer, the term of this patent is extended or adjusted under 35 U.S.C. 154(b) by 0 days.

(21) Appl. No.: 09/869,177

(22) PCT Filed: Dec. 20, 1999

(86) PCT No.: PCT/NO99/00396
§ 371 (c)(1),
(2), (4) Date: Sep. 4, 2001

(87) PCT Pub. No.: WO00/37986
PCT Pub. Date: Jun. 29, 2000

(30) Foreign Application Priority Data

Dec. 21, 1998 (NO) .............................................. 986025

(51) Int. Cl.⁷ ...................... G03B 21/34; B23B 17/06; B65G 47/74; B32B 17/00
(52) U.S. Cl. ..................... 156/557; 156/363; 156/556; 156/566; 156/569; 156/578
(58) Field of Search ................. 156/556, 557, 156/564, 566, 569, 570, 363, 578, 356, 357

(56) References Cited

U.S. PATENT DOCUMENTS

| | | | | |
|---|---|---|---|---|
| 3,930,928 A | * | 1/1976 | Tapert ........................ | 156/556 |
| 4,171,241 A | | 10/1979 | Henderson et al. ......... | 156/556 |
| 4,203,797 A | * | 5/1980 | Stormby ..................... | 156/521 |
| 4,267,003 A | * | 5/1981 | Mesch et al. ............... | 156/356 |
| 4,455,188 A | | 6/1984 | Stormby ..................... | 156/355 |
| 4,537,648 A | * | 8/1985 | Shiino et al. ............... | 156/351 |
| 5,580,414 A | | 12/1996 | Ljungmann ................. | 156/363 |
| 5,700,346 A | * | 12/1997 | Edwards ..................... | 156/357 |
| 6,382,693 B1 | * | 5/2002 | Ljungmann ................. | 294/64.1 |

FOREIGN PATENT DOCUMENTS

WO    WO 94/14097    6/1994

* cited by examiner

Primary Examiner—Richard Crispino
Assistant Examiner—Sue A. Purvis
(74) Attorney, Agent, or Firm—Marshall, Gerstein & Borun LLP (57) ABSTRACT

A machine is provided for automatically attaching cover slips to microscope slides having specimens for microscopic examination, including a first magazine for microscope slides, a second magazine for cover slips, and a reciprocating transport means for transport of slides and cover slips from the respective magazines to a working station. The apparatus further includes a pump for application of adhesives to slides, and a lifting means for lifting and placing of a cover slip on a slide which is provided with adhesive. The two magazines are located on opposite sides of the transport means, and that the transport means is arranged to carry a slide from the first magazine to the working station in an outgoing movement from a home position, and to carry a cover slip from the second magazine to the working station in a return movement. The lifting means is arranged to lift a cover slip from the transport means before the latter is allowed to start its outgoing movement, and further is arranged to place a cover slip on the slide on the working station with terminated outgoing movement of the transport means and after application of adhesive to the slide by the pumping means. The transport means is arranged to bring the slide with attached cover slip back to the first magazine during its return movement, at the same time as a new cover slip is carried from the second magazine to the working station.

15 Claims, 7 Drawing Sheets

MACHINE FOR AUTOMATICALLY ATTACHING COVER SLIPS TO MICROSCOPE SLIDES

BACKGROUND OF THE INVENTION

The invention relates to a machine for automatically attaching cover slips to microscope slides having specimens for microscopic examination, comprising a first magazine for microscope slides, a second magazine for cover slips, and a reciprocating transport means for transport of slides and cover slips from the respective magazines to a working station comprising a pumping means for application of adhesive to slides, and a lifting means for lifting and placing of a cover slip on a slide which is provided with adhesive.

Such application of cover slips or cover glasses to microscope slides especially is carried out in hospitals and in medical laboratories, wherein microscope slides having different types of medical specimens must be covered by protective cover slips. The tissue specimens which are to be examined, are either histologic specimens in the form of thin cuts (3–4 $\mu$m thick) or cytologic smears. Both types of specimens are coloured in a stainer prior to sealing in order to bring out the cell structure. In this connection it is usual to make use of a basket which contains a number of slides, as a carrier during the staining as well as the sealing process.

On the market there exist several types of machines or apparatuses carrying out gluing of cover slips on slides. An apparatus or machine of the type stated in the introduction is, for example, known from the international patent application No. PCT/NO93/00188 (WO 94/14097). In this apparatus, a slides magazine is arranged next to a cover slips magazine, and a reciprocating sliding means provides for simultaneous feeding of a slide and a cover slip to a position next to each other on a working station where the cover slip is placed on the slide after application of adhesive thereon. The cover slips magazine here consists of a wall-forming frame member surrounding a stack of cover slips which are all the time supported by the sliding means, the sliding means having a recess which, in an initial position, receives the lowermost cover slip in the stack, so that the sliding means brings individual cover slips to the working station. Since the stack of cover slips are supported by the sliding means, the stack will remain on the sliding means if the magazine frame member is lifted therefrom. Accordingly, a loaded cover slips magazine here is not a separate unit which is able to be exchanged and replaced by another preloaded cover slips magazine containing a different cover-slip size.

In machines and apparatuses of the topical type it is important that the period from the time when the tissue specimens are taken out from the colouring process until they are sealed, is as short as possible. A dehydration of the specimens results in a poorer sealing and readability of the tissue condition, air bubbles then arising in the tissue. In other words, it is important that the machine works as quickly as possible. Further, there are several laboratories which use different cover-slip sizes, and a rapid change from one cover-slip size to another here is of great importance. A cover-slip attaching apparatus of the type utilizing tape for sealing, does not have said drawbacks, the apparatus working very quickly and not being dependent on cover slips of a certain size. However, in addition to being prone to getting scratches, the tape has the drawbacks that it is not planar if the tissue specimen is not planar, and that in some cases it has a tendency to loosen over time. Therefore, there is a clear tendency that more and more laboratories want to use cover slips which are manufactured from glass. It is important that the cover slip is placed in the glue with a very calm movement and such that air bubbles are not captured under the cover slip.

In addition to the fact that the known machines and apparatuses on the market do not have such a high working speed as desirable, the are relatively big. Further, they have a poor accessibility for removal of glue and glass residues and for other maintenance which is necessary

SUMMARY OF THE INVENTION

It is an object of the invention to provide a machine of the topical type having such a high working speed that microbubbles are avoided without additional wetting of the tissue with unnecessary solvent being necessary, at the same time as one avoids getting air bubbles in the tissue.

Another object of the invention is to provide such a machine which enables a rapid change from one cover slip size to another.

A further object of the invention is to provide a machine which is very small and compact and also silent-running, and which has such a design that the user is protected against glass fragments which may spatter around in case of accidental crushing of cover slips, as well as against inhalation of solvent gases.

A still further object of the invention is to provide a machine having a construction giving good accessibility for daily cleaning, operation and service, in order to achieve a substantial improvement of the operational security.

For achieving the above-mentioned objects there is provided a machine of the introductorily stated type which, according to the invention, is characterized in that the two magazines are located on opposite sides of the transport means, and that the transport means is arranged to carry a slide from the first magazine to the working station in an outgoing movement from a home position, and to carry a cover slip from the second magazine to the working station in a return movement, the lifting means being arranged to lift a cover slip from the transport means before the latter is allowed to start its outgoing movement, and further is arranged to place a cover slip on the slide on the working station with terminated outgoing movement of the transport means and after application of adhesive to the slide by the pumping means, the transport means being arranged to bring the slide with attached cover slip back to the first magazine during its return movement, at the same time as a new cover slip is carried from the second magazine to the working station.

BRIEF DESCRIPTION OF THE DRAWINGS

The invention will be further described below in connection with exemplary embodiments with reference to the drawings, wherein

FIGS. 15A, B and C show front views of the pumping means, in the way it is shown in FIG. 14, in three different operating positions.

DETAILED DESCRIPTION OF THE INVENTION

As appears from FIGS. 1–6, the shown embodiment of the apparatus or machine 1 according to the invention has a generally box-like shape and is divided into a rearward and a forward main chamber 2 and 3, respectively, by means of a longitudinal, vertical partition wall 4 forming a support for most of the units and component parts of the machine. The rearward main chamber 2 is closed and contains all motors used for operation of the machine, and also all electronics including a processor unit for controlling the operation of the machine, and a power supply. The forward main chamber 3 on the front side is shielded by a transparent sliding door 5 which may also be lifted completely off for maximum accessibility. This chamber contains as main elements a first magazine 6 (also called slides magazine) for receiving at least one basket 7 for slides 8, a second magazine 9 for receiving a stack 10 of cover slips 11, a reciprocating means 12 for transport of slides and cover slips from the respective magazines 6, 9 to a working station 13, a pumping means 14 arranged on the working station for application of adhesive/glue on slides, and a lifting means 15 for lifting and lowering of cover slips on the working station.

Figure 13:
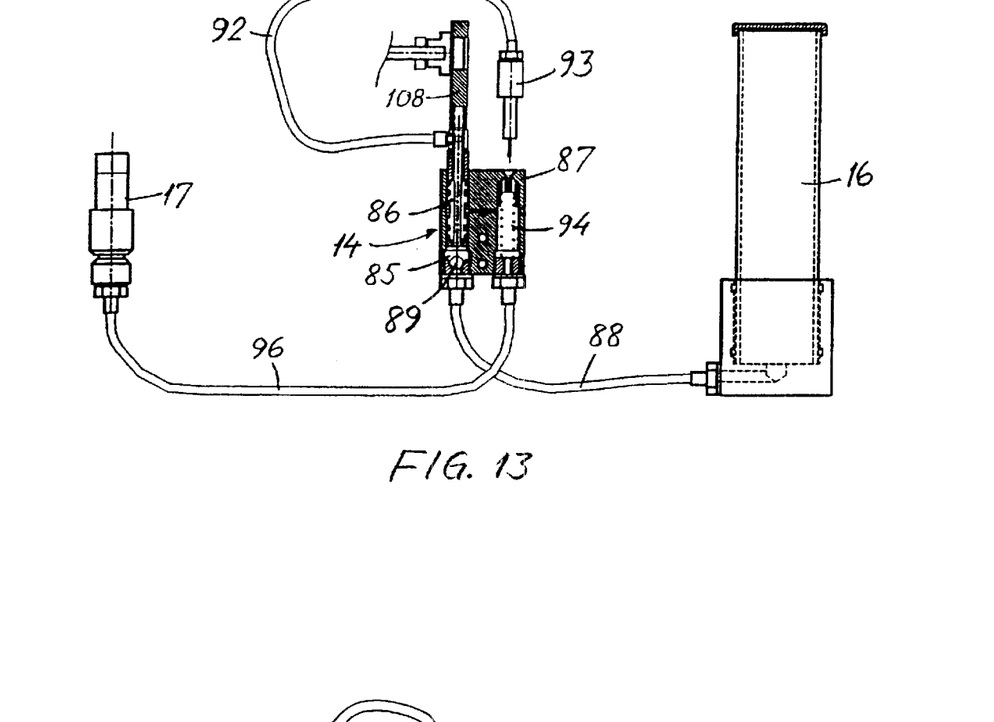
FIG. 13 shows a longitudinal section of the pumping means corresponding to that of FIG. 5, but with a connected glue container and a glue dispenser, and with a connected solvent container.
Figure 14:
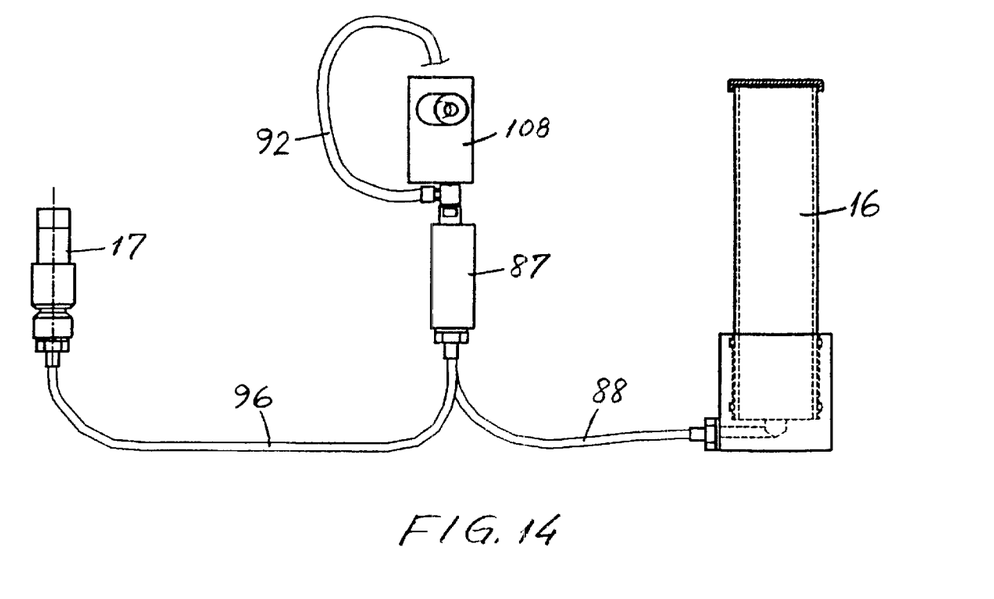
FIG. 14 shows a front view of the pumping means, in a plane at right angles to the sectional plane in FIG. 13.
Figure 15:
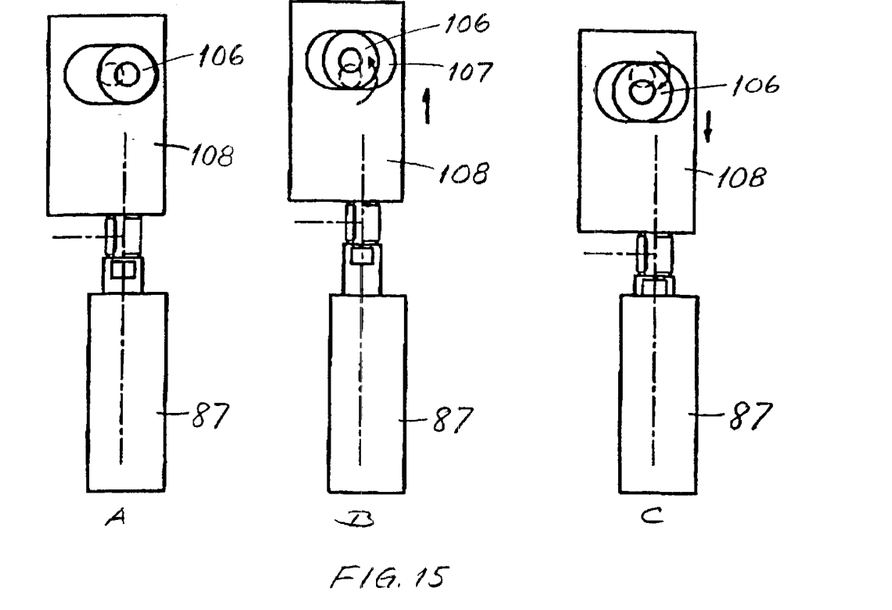
Figure 16:
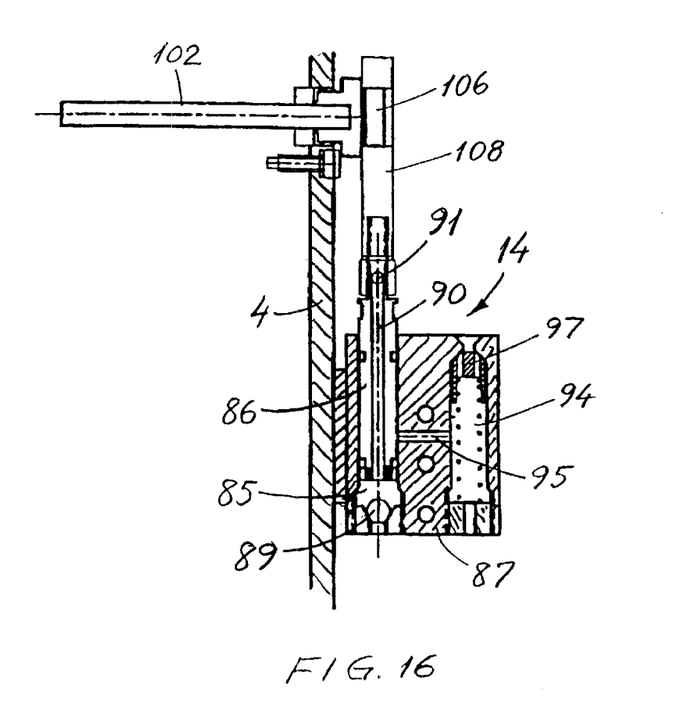
FIG. 16 shows a longitudinal section of the pumping means on a somewhat enlarged scale.

Further, at the right side of the forward main chamber 3, there is arranged a glue container 16 which is connected to the suction part of the pump (see FIGS. 13 and 14), and on the left side, next to the cover slips magazine 9, there is placed a transparent, detachable solvent container 17 the function of which is to be further described in connection with FIGS. 13 and 14. The glue container 16 is exposed when the above-mentioned sliding door 5 is in a left end position, whereas the solvent container 17 and the cover slips magazine 9 are exposed when the sliding door is in a right end position. In the chamber 3 there is also arranged a fan 18 providing for venting of solvent gases via a hose connection 19.

As appears from the FIGS. 1 and 9–12, the two magazines 6, 9 are located on opposite sides of the transport means 12, this being arranged to carry a slide 8 from the slides magazine 6 to the working station 13 in an outgoing movement from a fetching or home position, and to carry a cover slip 11 from the cover slips magazine 9 to the working station in a return movement to the home position. Thus, the transport means goes in "shuttle traffic" between the two magazines 6 and 9. The arrangement is such that the transport means brings a slide with an attached cover slip back to the slides magazine during its return movement, at the same time as a new cover slip is carried from the cover slips magazine to the working station. Since the shuttle movement is carried out continuously, without any waiting time, there is achieved a machine with a very high working speed.

Figure 4:
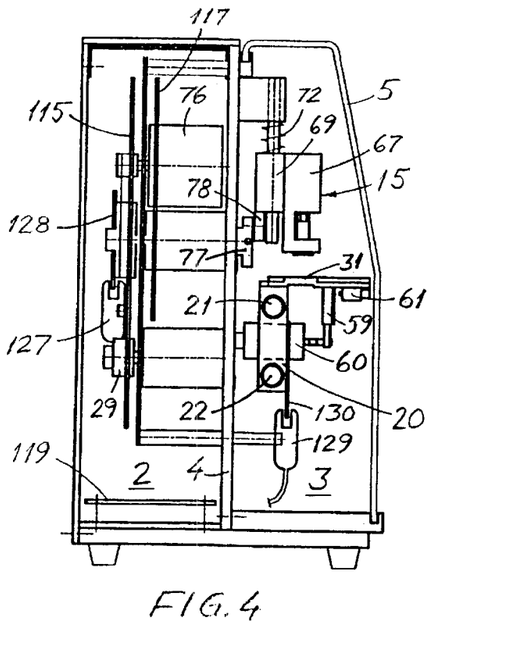
FIG. 4 shows an end view corresponding to FIG. 3, but with the end wall removed to show internal details of the machine.

The transport means 12 comprises a carriage 20 which is displaceable on a pair of horizontal guide rods 21, 22, and which is pulled back and forth between the magazines 6 and 9 by means of a tooth belt 23. The tooth belt runs over a pair of guide rollers 24, 25 and is driven by a carriage motor 26 (shown stippled in FIG. 6). The rotation of the carriage motor is transferred to the tooth belt 23 via a transmission means comprising a tooth belt wheel 27 on the motor shaft, an additional tooth belt 28 and an additional tooth belt wheel 29 on a shaft 30 on the forward end of which there is fixed a driving gear wheel (not shown) which is in engagement with the tooth belt 23. The shaft is supported in the same manner as shown in FIG. 4 for the transmission shaft for the pumping means 14, and a corresponding arrangement is also used for the other driving motors, all the motors as mentioned being installed in the rearward main chamber 2 of the machine.

At the top of the carriage 20 there is mounted a transport or carrier plate 31. The function of this plate is to provide for pulling-out or extraction of a slide 8 from the slides magazine 6 during the outgoing movement of the carriage 20, and also to carry a cover slip 11 from the cover slips magazine 9 to the working station 13 in the return movement of the carriage. The dimensioning of the components and the mutual distance between the working station and the cover slips magazine are adapted in such a manner that the carrier plate 31, at the end point of the outgoing movement of the carriage, has brought a slide to the correct position on the working station, at the same time as the carrier plate then is situated in the correct position for carrying along a cover slip from the cover slips magazine in the return movement of the carriage.

The slides magazine 6 is designed for receiving at least one basket 7 having a number of horizontal shelves for support of a corresponding number of microscope slides 8. The magazine is provided with vertical slide profiles 35 ensuring that the baskets can be inserted only with the correct orientation in the magazine. On the side facing away from the working station 13, the baskets are provided with teeth 36 for engagement with corresponding teeth on a small toothed wheel 37 which is arranged to be rotated by a feeding-down motor 38, so that the baskets can be fed down stepwise one tooth position, to successively bring a new slide into position for extraction in normal operation of the machine. The magazine is also provided with sensors (not shown) to sense if a basket is present, and to register that a basket is completely fed down and falls down from the magazine.

Figure 6:
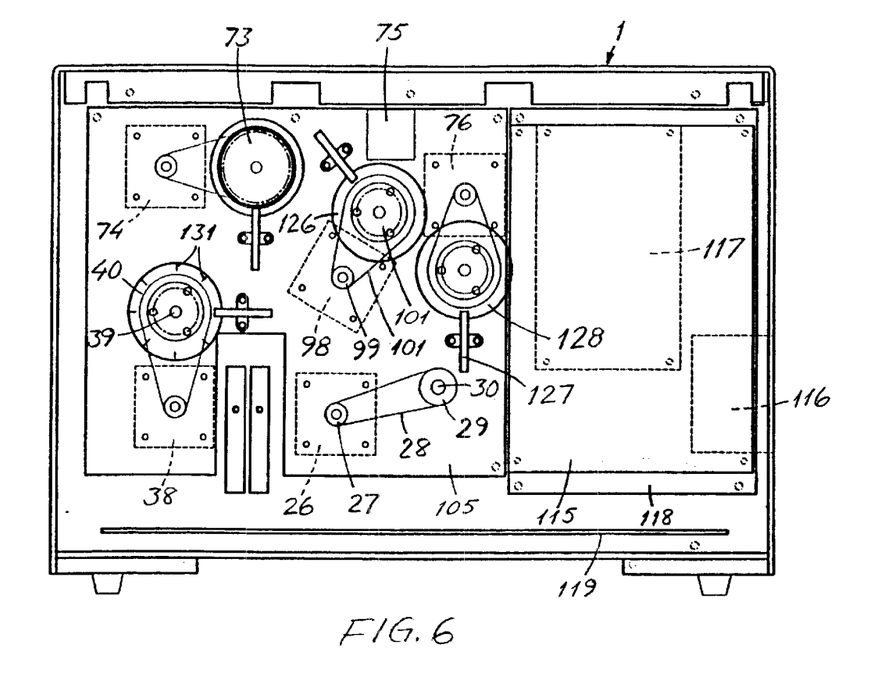
FIG. 6 shows a view of the machine in FIG. 1, as viewed from behind and with the back cover of the machine removed.

The feeding-down toothed wheel 37 sits on a shaft 39 which is coupled to the motor 38 through a similar transmission as the one described in connection with the carriage motor 26. As shown in FIG. 6, on the tooth belt wheel on the shaft 39 there is mounted a signal disc 40 for control of the rotational movement of the motor, as further described later.

The cover slips magazine 9 is a unit which is arranged for detachable mounting in the machine, so that one is able to carry out a quick replacement and put in place other cover slips magazines which are possibly dimensioned for other cover slip sizes. As regards the microscope slides, these normally have only one size, viz. 76×26×1 mm (3"×1"× ⅒"), whereas the cover slips are 24 mm wide and 0,15 mm thick, and can have a length of 40, 50, 55 or 60 mm.

The machine is provided with sensors (not shown) sensing the dimension of the cover slips magazine inserted in the machine, and providing for possible necessary readjustment of the control functions of the machine, so that this is operated in the correct manner, in accordance with the chosen cover slip size. As will be appreciated, the cover slip length has an influence on the length of the return movement of the carriage 20 and on the length of the glue stripe which is pumped out onto a slide on the working station 13, as mentioned in connection with the description of the manner of operation of the machine. As described later, these parameters can be chosen in a so-called parameter list in association with the operating menu of the machine, or they may be chosen by means of the above-mentioned sensors by means of which the machine "senses" which cover slips magazine is inserted in the machine.

Figure 1:
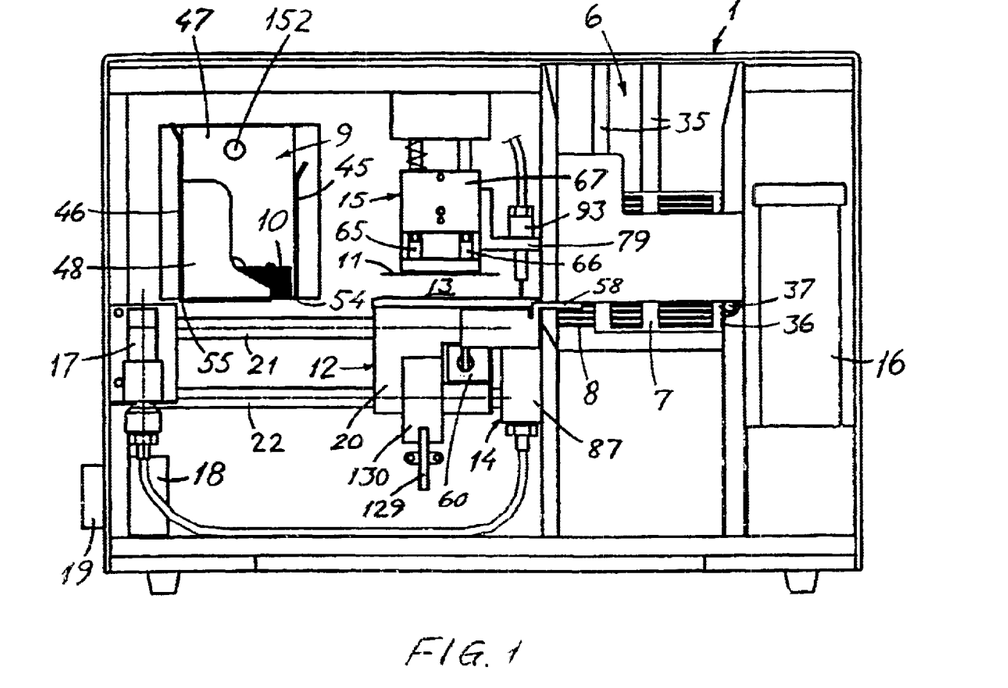
FIG. 1 shows a front view of a machine according to the invention, wherein some details are omitted to expose and show other details.
Figure 2:
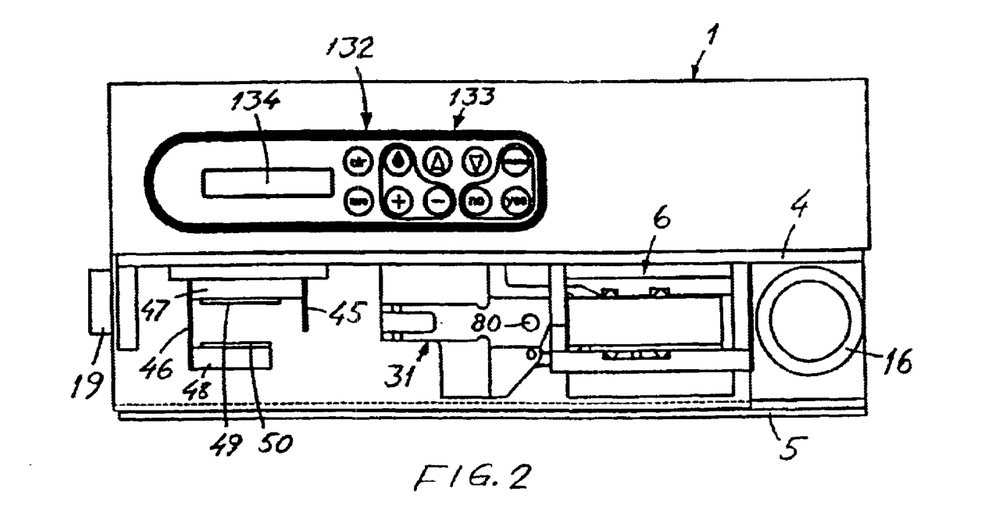
FIG. 2 shows the machine in FIG. 1, as viewed from above and with some component parts omitted.

As appears from FIGS. 1 and 2, the cover slips magazine 9 is defined by a forward and a backward end wall 45 and 46, respectively, and two parallel side walls 47 and 48. The bottom of the magazine is open except for a pair of edge flanges 49, 50 extending along the lower end edges of the side walls 47, 48 and forming a support for the cover slips stack 10 in the magazine. When placing a new magazine in the machine, this is guided in place by means of a pair of guide pins 151 (only one is shown, see FIGS. 9 and 11) providing for an accurate positioning of the magazine. The magazine may for example, be fixed with a simple screw, or by means of a pair of permanent magnets 152 as shown, for even more rapid magazine change.

Figure 7:
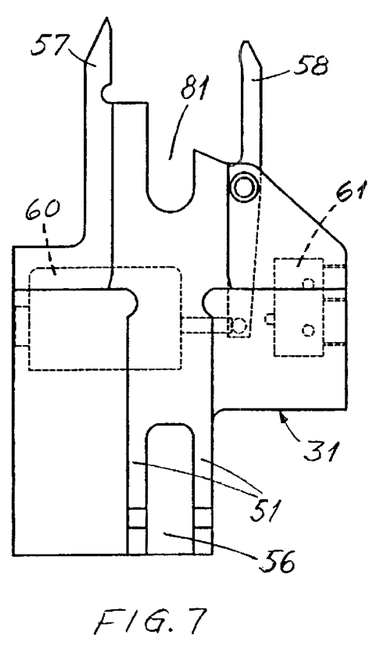
FIGS. 7 and 8 show plan views of a carrier plate on the transport means, with a gripping finger shown in two different operating positions.
Figure 8:
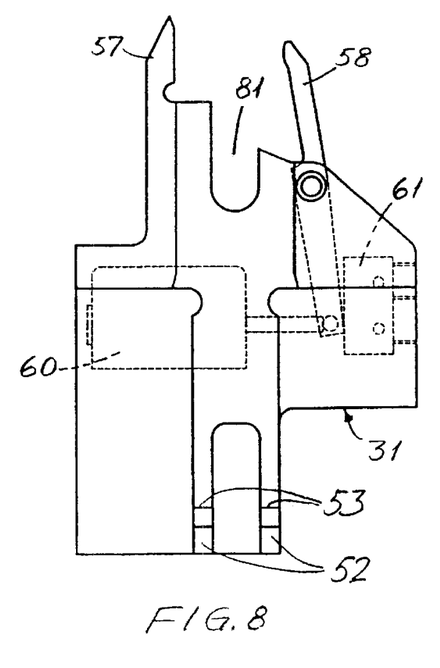
Figure 9:
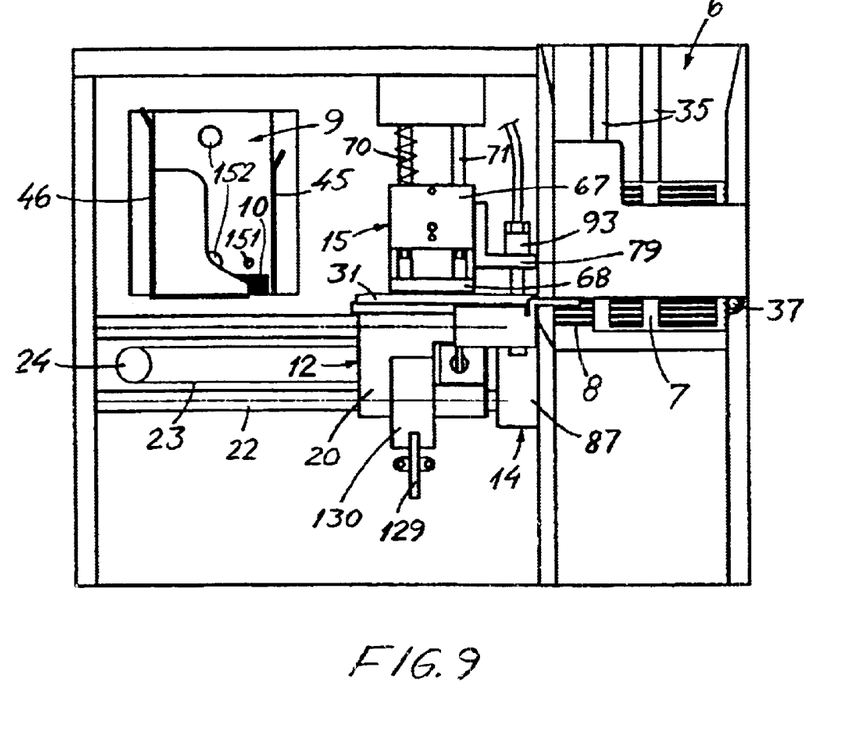
FIGS. 9 and 10 show a front view and a plan view, respectively, of a section of the machine in FIG. 1 (with some parts omitted), and show the transport means in the home or fetching position.
Figure 10:
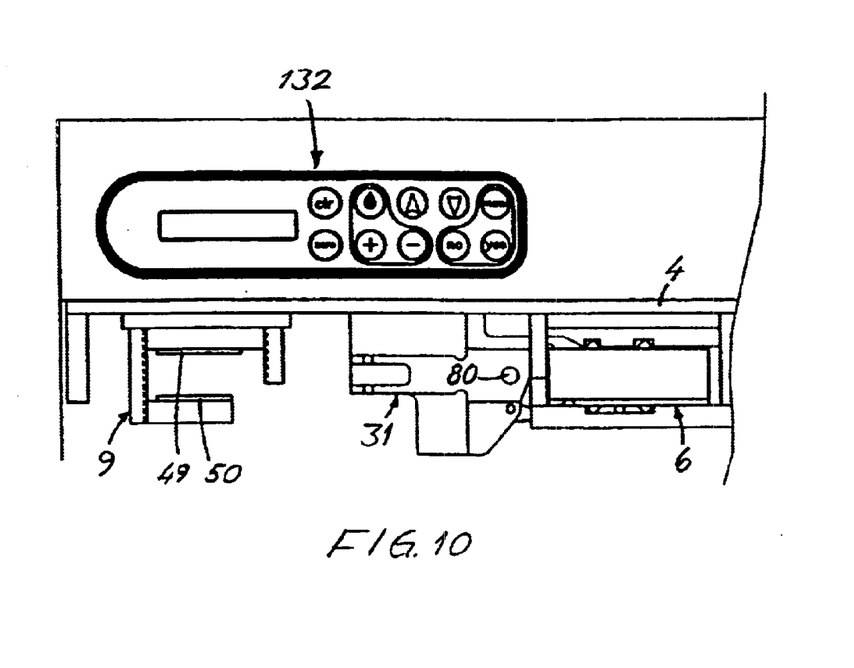
Figure 11:
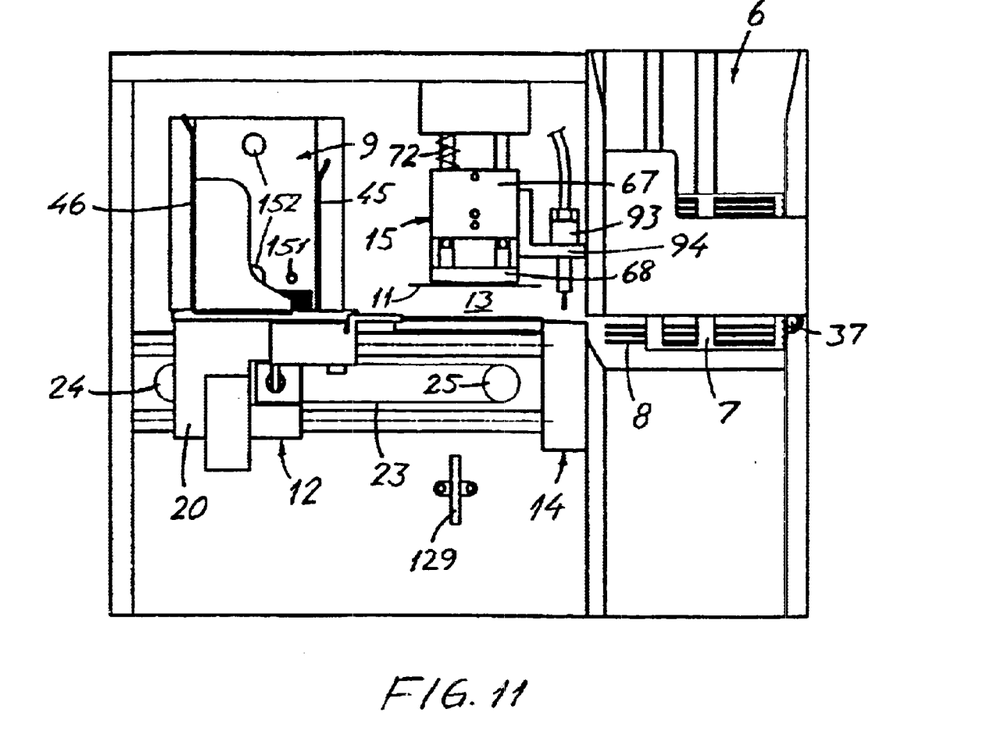
FIGS. 11 and 12 show a front view and a plan view, respectively, of a section of the machine (with some parts omitted), in a manner corresponding to FIGS. 9 and 10, but with a slide in a pulled-out position.
Figure 12:
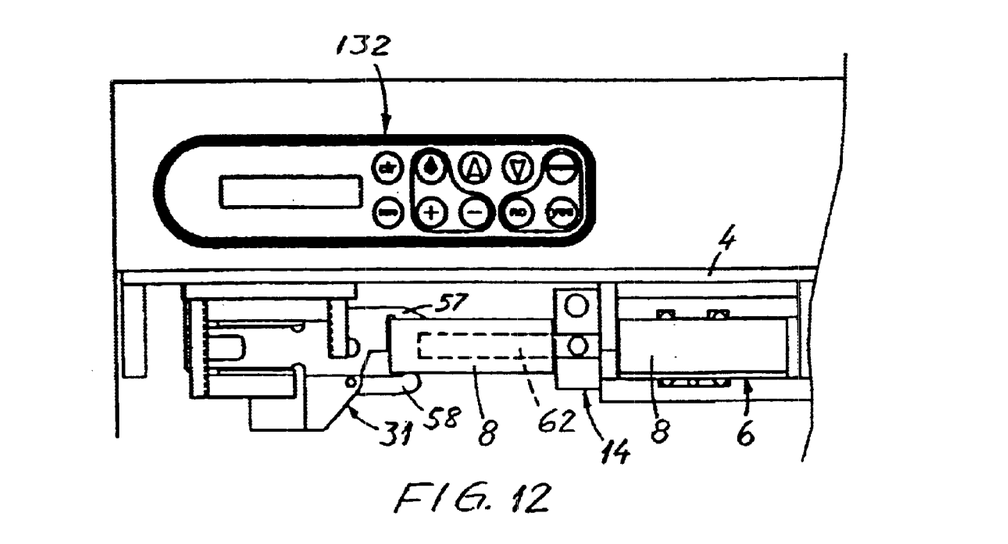

The cover slips magazine is designed and positioned to cooperate with the carrier plate 31 which is shown in detail in FIGS. 7 and 8. Said edge flanges 49, 50 have a somewhat lower level than the upper surface of the carrier plate, and a mutual distance allowing introduction of a rearward part 51 of the carrier plate therebetween. The rearward part 51 at its free end is formed with an inclined plane 52 for lifting of the cover slips stack 10 in the cover slips magazine when introducing said part 51 into the magazine, and with a gripping edge 53 adjacent to the inclined plane having a height corresponding to the cover slip thickness, so that only one cover slip 11, which falls down in front of the gripping edge when the part 51 of the carrier plate is introduced into the magazine, is pulled out from the magazine in the return movement of the carrier plate. The lower edge 54 of the forward end wall 45 of the magazine is located at such a level above the carrier plate 31 that the remaining cover slips in the stack are kept back in the return movement, and the remaining cover slips will sink onto the edge flanges 49, 50.

The rearward end wall 46 of the cover slips magazine at its lower edge 55 is formed with a narrow depending portion corresponding to a recess or slot 56 in the rearward part 51 of the carrier plate 31, so that the lowermost cover slips in the stack 10 will not be pushed out from the magazine when the rearward part 51 is introduced into the magazine and lifts up the cover slips.

At its forward end the carrier plate 31 is provided with a fixed gripping rest 57 and with a pivotally mounted gripping finger 58 having a forward end which is adapted for gripping and pulling-out of slides 8 from the slides magazine 6. At its rearward end the gripping finger 58 has a downwards extending pin 59 (see FIG. 4) which is adapted to be influenced by the armature of an electromagnet 60 fitted on the carriage 20. The gripping finger also constitutes a sensing means for sensing whether a slide is present in a feed-out position when the transport means 12 is in its home position. If the gripping finger "finds" a slide when it is in its home position in the magazine 6 and is influenced by the electromagnet 60, the slide will be retained by the gripping finger, and after a short time-out period, under the control of the processor unit of the machine, the machine will proceed in its working cycle, as further described later. On the other hand, if the gripping finger does not find a slide during the first part of its turning movement, it will continue its movement under the influence of the electromagnet, and then actuate a microswitch 61 fitted on the underside of the carrier plate 31. The actuation of the microswitch will entail that the gripping finger 58 returns to the open position, and in addition that the motor 38 for feeding-down of baskets starts and feeds down the basket 7 in the magazine one step. This operation is repeated until the gripping finger finds a slide. The machine thereafter carries out some working operations associated with the lifting means 15, and which will be further described below, and thereafter the carriage 20 is started and the carrier plate 31 carries a slide 8 to the correct position on the working station on a rail 62 (see FIG. 12) functioning as a sliding base for the slide.

The lifting means 15 for lifting and lowering of cover slips 11 comprises a pair of suction cups 65, 66 fitted in a suction cup head 67, so that they have—or may be positioned in—a suitable mutual distance for gripping of the end portions of a cover slip. At the lower ends of the suction cups there is arranged an abutment member 68 which preferably has a downwards convexly curved, resilient abutment surface, so that the suction cups when activated pull up the cover slips to a slightly curved position resting against the abutment surface. As appears, the suction cup head 67 is fixed to a lifting block 69 which is slidable on a pair of vertical guide posts 70, 71 and is spring-loaded downwards by means of a spring 72.

The suction cups 65, 66 are connected to a vacuum cylinder 73 in the form of a so-called "twist cylinder" which is coupled to a vacuum motor 74 through a transmission of a design corresponding to that described above in connection with the carriage motor 26. The internal volume of the twist cylinder 73 communicates with a vacuum watch 75 delivering a signal if a vacuum is obtained between the twist cylinder and the suction cups after start of the vacuum motor 74 when the gripping finger 58 has gripped a slide in the feed-out position, as further described in connection with the manner of operation of the machine. When a vacuum is obtained, this means that a cover slip is present on the working station, and that this is retained by the suction cups.

The lifting means further comprises a lifting motor 76 which, through a transmission means of the above-mentioned type, is coupled to the lifting block 69 via an eccentric means 77 which also comprises an eccentrically placed ball bearing 78, as shown in FIG. 4. When a vacuum is obtained, the lifting motor provides for lifting of the suction cup head with the retained cover slip from the carrier plate 31. Said eccentric means causes the lifted cover slip, when the transport means has completed its outgoing movement, to be lowered onto the slide with a sinusoidal movement, so that the cover slip hits the glue on the slide with a relatively slow motion. The eccentric means is constructed in a manner corresponding to that of an eccentric means for the pumping means which is to be further described below.

Figure 5:
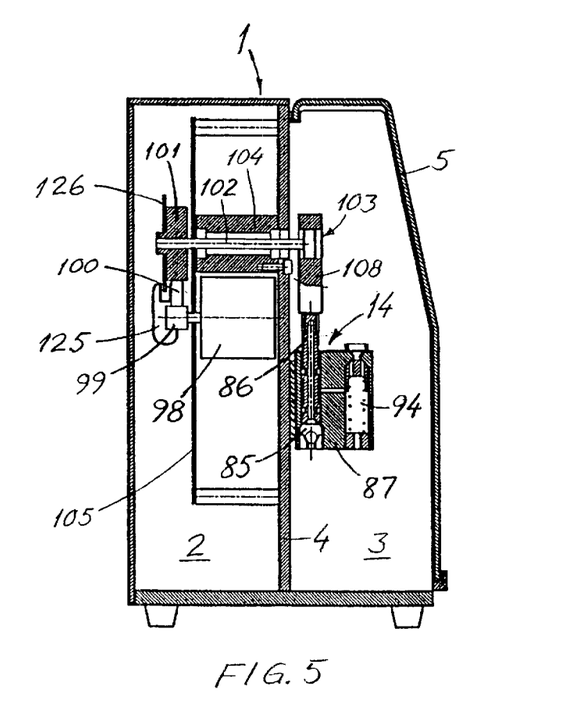
FIG. 5 shows a vertical cross-sectional view of the machine and shows a longitudinal section through the pumping means of the machine and its associated motor drive means.

The pumping means 14 with associated motor drive means is shown in FIG. 5, and further details of the pumping arrangement are shown in FIG. 13–16. The pump proper is a cylinder/piston unit consisting of a cylinder 85 and a piston 86 which are fixedly mounted in a housing 87 fixed to the partition wall 4. The pumping means is connected to the glue container 16 via a hose 88 which is connected to the lower end of the cylinder 85 through a check valve 89. The piston 86 is provided with a central passage 90 which, through an upper opening 91 and a hose 92, is connected to a glue dispenser 93 which is fixed to the suction cup head 67 of the lifting means by a bracket 79.

In the housing 87 there is also fixedly mounted a solvent container 94 for receiving a glue-dissolving solvent, e.g. xylene. The solvent container 94 communicates with the pump cylinder 85 through a channel 95, and it is further connected to the transparent and detachable solvent container 17 via a hose 96. At its upper end the fixed container 94 is provided with a spring-loaded closing valve 97.

The glue dispenser 93, which opens through an internal check valve (not shown), is fitted in such a position on the suction cup head 67 that its outlet end is moved down into the solvent in the solvent container 94 via the closing valve 97 when the suction cup head with the bracket 79 is lowered to its lower position. Thus, the solvent in the container 94 serves both to keep the dispenser outlet open and to prevent the piston 86 from being glued to and stuck in the cylinder. The transparent container 17 serves both as a level control and for filling and emptying of the fixed solvent container 94. The carrier plate 31 has a suitable opening 80 (FIGS. 2 and 10) or slot 81 (FIGS. 7 and 8) allowing the dispenser 93 to be lowered into and lifted from the solvent container 94.

The pumping means is driven by a pump motor 98 which is mounted in the rearward main chamber 2, as shown in FIGS. 5 and 6. The pump motor is coupled to the pump unit 85, 86 through a transmission means comprising a tooth belt wheel 99 on the motor shaft, a tooth belt 100 and an additional tooth belt wheel 101 which is fixed on one end of a drive shaft 102 of which the other end is coupled to an eccentric means 103 driving the pump. The drive shaft 102 is mounted by means of ball bearings in an intermediate block 104 which is fastened between the partition wall 4 and a mounting plate 105 in the rearward chamber 2.

The eccentric means 103 comprises an eccentrically mounted wheel 106 placed in a guide recess 107 in a yoke 108 which is connected to the piston 86. The initial position of the eccentric means is a horizontal position (3 o'clock) as shown in FIG. 15A. When starting the pump motor 98, this is controlled so that it rotates half a stroke backwards, for instance to a position of the eccentric wheel corresponding to one o'clock as shown in FIG. 15B, and half the set glue quantity then is sucked into the cylinder. As described later in connection with the manner of operation of the machine, the other half of the set glue quantity has been sucked in at an earlier stage of the operation. The whole pump stroke then is carried out in that the pump motor rotates the eccentric wheel in the opposite direction to 5 o'clock (i.e. 120°), as shown in FIG. 15C, and the glue in the cylinder 85 then is pumped out in that the yoke with the piston 86 is pressed down. Because of the check valve 89 in the cylinder, the glue is pressed upwards through the passage 90 in the cylinder and into the hose 92 leading to the dispenser 93.

As mentioned above, all the illustrated motors 26, 38, 74, 76 and 98 are installed in the rearward main chamber 2 of the machine. The used motors are digitally controlled step motors. The rotational movement of the motors is controlled in that the motors are supplied with pulse trains having a desired number of pulses and having a desired polarity from a central processing unit (CPU) in the form of a microprocessor. The polarity of the pulses determines the rotational direction.

Figure 3:
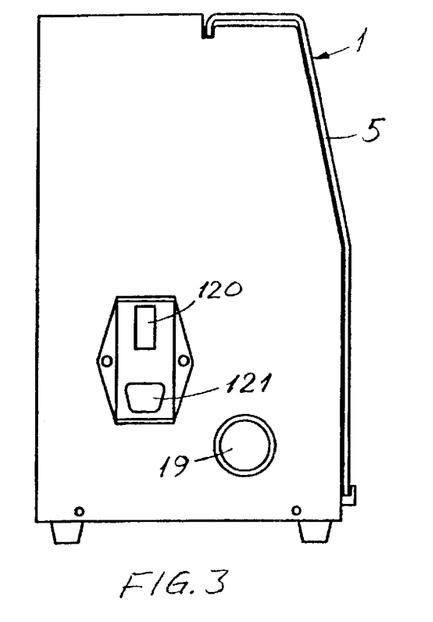
FIG. 3 shows an end view of the machine in FIGS. 1 and 2, as viewed from the left.

The processor unit is mounted on a CPU board 115 in the main chamber 2. As appears from FIGS. 4 and 6, the rearward chamber also contains the main switch 116 of the machine, a power supply 117, an electronics plate 118 comprising the electronic circuitry of the machine, and a driver board 119 for the step motors. The ON/OFF button 120 and a cable connection 121 of the main switch are shown in FIG. 3.

The start and stop positions of the motors are controlled by means of signal discs which are adjustably mounted on the driving shafts of the transmission means for the motors, and which cooperate with fixedly mounted photo-cell sensing means in the form of so-called read forks. In FIG. 5 such a read fork 125 is shown in connection with a signal disc 126 on the tooth belt wheel 101 on the transmission shaft 102 of the pumping means. (It is to be noted that the read fork for this signal disc is shown to be mounted in a different position in FIG. 6.) In FIGS. 4 and 6 a corresponding read fork 127 is shown to be mounted in connection with the signal disc 128 for the drive motor 76 of the lifting means. Corresponding read forks and signal discs are shown in connection with the feed-down motor 38 and the vacuum motor 74. As regards the carriage motor 26, the start/stop position thereof is controlled by a read fork 129 mounted on the partition wall 4 in connection with a tongue 130 extending downwards from the carriage 20.

The signal discs for the motors 74, 76 and 98 are shown as circular discs, but are in practice formed with part-circular sector portions having a different radius, so that the light from the respective sensor photo-cell is interrupted in the desired rotational position of the disc.

As regards the signal disc 40 for the basket feed-down motor 38, this is circular as shown in FIG. 6, but is provided along its periphery with eight radial slots 131 having an angular distance of 45°, a rotation of the feed-down toothed wheel 37 of 45° corresponding to a basket feeding-down of one step, i.e. the distance between two slides shelves in the basket in question.

A control panel 132 for operation of the machine is arranged on the upper side thereof as shown in FIG. 2, and comprises a switch panel 133 having a number of buttons allowing the necessary settings and operations, and a display 134 giving information about the status of the machine and showing error messages in case of irregularities or malfunctions.

All the movements of the machine are controlled digitally by means of the microprocessor which is based on counting of pulses for control of the step motors and for measuring chosen timeout periods regulating the time for start of the various operations. The number of pulses and the desired time intervals can be chosen quickly in the menu of the machine with the associated parameter list, i.e. a list of parameters which are decisive for the operations of the machine. By a suitable programming/setting of the pulse number for stop of each motor motion, based on test runs of the machine, the operations thereof can by adjusted and performed very accurately.

The manner of operation of the machine will be described below in connection with a normal operating sequence.

After the placing of a basket 7 in the slides magazine 6, the machine starts automatically after 2 seconds if the start button has not already been depressed. The gripping finger 58 is operated by the electromagnet 60 and grips a slide 8. If a slide is not present, the gripping finger is opened and the basket is fed down one step. After a short time interval (0,1 s) the vacuum motor 74 starts and rotates the twist cylinder 73 (ca. 200°), so that a certain vacuum is created in the volume between the twist cylinder chamber and the suction cups 65, 66 resting against the cover slip 11 on the working station 13. When the vacuum watch 75 acknowledges a vacuum, the lifting motor 76 starts and causes lifting of the suction cup head 67 with the cover slip and the glue dispenser 93 to a suitable height above the carrier plate 31. Simultaneously the pump motor 98 rotates half a stroke backwards, so that half the set glue quantity is sucked into the cylinder 85. Thereafter the carriage motor 26 starts, and the carrier plate 31 starts pulling out the slide 8 from the magazine 6, and in the correctly set position of the slide the pump motor 98 starts in the opposite direction and glue is pumped out via the dispenser 93, so that the set glue quantity is pumped out along the centre line of the slide and in a set length during the outgoing movement of the slide. The eccentric means 103 causes that one gets a symmetrical, slightly "boat-shaped" glue quantity with most of the glue in the middle and a decreasing glue quantity in the direction towards the end edges of the slide. When the correct outgoing movement of the carrier plate 31 is achieved, the cover slip will "hang" in the correct position above the slide, at the same time as the left or rearward part 51 has arrived at the correct position for pulling out a new cover slip from the cover slips magazine 9 in the return movement. The lifting means is now lowered so that the cover slip is placed in the glue on the slide. By means of the eccentric means 77 the cover slip is lowered with a sinusoidal movement, so that the cover slip hits the glue with a relatively slow motion. Since the cover slip 11 is lowered in a slightly curved condition as mentioned above, the "boat-shaped" configuration of the glue quantity with the highest point in the middle will contribute to enhancing the pressing-out of the glue and possible air bubbles towards the ends.

After the lifting means has been lowered, the vacuum motor 74 starts once more, but in the opposite direction, so that the twist cylinder 73 rotates approximately 70° in the opposite direction from its home position. Thereby the vacuum is reduced and replaced by a small overpressure, so that the suction cups release the cover slip. Thereafter the lifting means goes up again, so that the suction cups are lifted clear of the cover slip, and the carrier plate returns to its home position and brings along a new cover slip to the lifting position at the same time as the finished sealed slide is pushed back to the shelf in the basket. The pump piston 86 is lifted back to its intermediate position, another half glue quantity being sucked in from the glue container 16. The feed-down motor 38 starts and feeds down the basket one step, and in this manner the operation continues until the basket falls down from the magazine and is registered by an optical sensor.

At the same time as the basket 7 is fed down one step, i.e. one tooth position, the lifting means 15 is lowered, so that the suction cups 65, 66 are pressed against the new cover slip which is placed on the working station 13. Simultaneously, the glue dispenser 93 is dipped into the solvent container 94, and remains therein until a new slide is found by the gripping finger 58.

If a vacuum is not obtained when the vacuum motor 74 starts and the twist cylinder 73 is rotated, this means that a cover slip is not present on the carrier plate 31. This will be the case at the first start of the machine. This results in that vacuum is disconnected and that the transport means 12 effects a movement cycle to carry a cover slip from the magazine 9 to the working station 13. Thereafter the machine is started again, as described above. If a vacuum is not obtained either in this case, the machine interprets this to mean that the cover slips magazine is empty and shows the message "Load cover glass" in the display of the control panel.

What is claimed is:

1. A machine for automatically attaching cover slips to microscope slides having specimens for microscopic examination, comprising a first magazine for microscope slides, a second magazine for cover slips, and a reciprocating transport means for transport of slides and cover slips from the respective magazines to a working station comprising a pumping means for application of adhesives to slides, and a lifting means for lifting and placing of a cover slip on a slide which is provided with adhesive, characterized in that the two magazines are located on opposite sides of the transport means, and that the transport means is arranged to carry a slide from the first magazine to the working station in an outgoing movement from a home position, and to carry a cover slip from the second magazine to the working station in a return movement, the lifting means being arranged to lift a cover slip from the transport means before the latter is allowed to start its outgoing movement, and further is arranged to place a cover slip on the slide on the working station with terminated outgoing movement of the transport means and after application of adhesive to the slide by the pumping means, the transport means being arranged to bring the slide with attached cover slip back to the first magazine during its return movement, at the same time as a new cover slip is carried from the second magazine to the working station.

2. A machine according to claim 1, characterized in that it has a box-like shape and is divided into a rearward closed main chamber and a forward main chamber by means of a longitudinally extending, vertical partition wall supporting most of the components of the machine, the rearward main chamber containing as main components a number of drive motors and electronics for operation and control of the function of the machine, and the forward main chamber containing as main components the two magazines, the transport means, the lifting means and the pumping means, and that the forward chamber at the front is covered by a transport sliding door adapted to be lifted off for maximum accessibility.

3. A machine according to claim 1, characterized in that the pumping means is arranged to apply adhesive to a slide during the movement thereof when carried by the transport means during the outgoing movement thereof.

4. A machine according to claim 1, characterized in that the cover slips magazine is a unit which is arranged for detachable mounting in the machine, with a view to rapid replacement and introduction of other cover slips magazines dimensioned for other cover slip sizes.

5. A machine according to claim 4, characterized in that it is provided with sensors which sense the dimension of the cover slips magazine inserted in the machine, and which provide for possible readjustment of the control functions of the machine, for operation in accordance with the chosen cover slip size.

6. A machine according to claim 4, characterized in that the cover slips magazine is defined by a forward and a rearward end wall and a pair of parallel side walls, and that it has an open bottom except for a pair of edge flanges extending along the lower end edges of the side walls and forming a support for a stack of cover slips in the magazine, the edge flanges having a somewhat lower level than a carrier plate on the transport means and a mutual distance allowing introduction of a part of the carrier plate therebetween, the carrier plate being designed to grip and pull out a cover slip from the underside of the stack in its return movement from the magazine.

7. A machine according to claim 6, characterized in that the carrier plate at its rearward end is provided with an inclined plane for lifting of the cover slips stack in the cover slips magazine when introducing said part of the carrier plate in the magazine, and with a gripping edge adjacent to the inclined plane having a height corresponding to the cover slip thickness, so that only one cover slip, which falls down in front of the gripping edge when the carrier plate has been introduced in the magazine, is pulled out from the magazine in the return movement of the transport means.

8. A machine according to claim 1, characterized in that the transport means is provided with a sensing means to sense if a slide is present in a feed-out position in the slides magazine when the transport means is in its home position, and that the lifting means is arranged for lifting of the cover slip situated on the transport means under the presupposition that a slide is present in said position.

9. A machine according to claim 8, wherein the first magazine is arranged to receive at least one basket having a number of shelves for support of slides, characterized in that the sensing means is an electromagnet-operated gripping finger for gripping of a slide in the feed-out position, the gripping finger, if a slide is not present, under the influence of the electromagnet operating a switch for start of a motor for stepwise feeding-down of the basket in said magazine until the gripping finger senses that a slide is present in the feed-out position.

10. A machine according to claim 9, characterized in that the lifting means comprises a suction cup means which is connected to a twist cylinder coupled to a vacuum motor, the vacuum motor being arranged to start when the gripping finger has gripped a slide in the feed-out position, to produce a vacuum in the twist cylinder to retain the cover slip on the transport means against the suction cup means, there being provided a lifting motor providing for lifting of the suction cup means with the cover slip from the transport means when a vacuum is obtained.

11. A machine according to claim 9, characterized in that at least one of said motors, is a digitally controlled step motor, the motor being arranged to be operated by means of pulses under the control of a processor unit.

12. A machine according to claim 10, characterized in that the lifting motor is coupled to the lifting means through an eccentric means causing the lifted cover slip, when the transport means has completed its outgoing movement, to be lowered onto the slide with a sinusoidal movement, so that the cover slip hits the glue with a relatively low speed.

13. A machine according to claim 1, characterized in that the pumping means is a cylinder/piston unit having a piston which is coupled to a pump motor through an eccentric means causing a symmetrical, slightly boat-shaped glue quantity to be pumped out from the cylinder onto the topical slide, with most of the glue in the middle and a decreasing glue quantity in the direction towards the end edges of the slide.

14. A machine according to claim 13, characterized in that one end of the pumping means is connected to a glue container and the other end is connected to a glue dispenser which is fixed to the lifting means, the glue dispenser, when the lifting means is lowered, being placed with its outlet end if a fixedly mounted solvent container connected to the pump cylinder and containing a solvent keeping the dispenser outlet open as well as preventing the piston from being glued to the cylinder.

15. A machine according to claim 14, characterized in that the fixedly mounted solvent container is connected via a hose connection to a detachable solvent container for level control, filling and emptying of the fixed container.

\* \* \* \* \*

UNITED STATES PATENT AND TRADEMARK OFFICE
CERTIFICATE OF CORRECTION

PATENT NO. : 6,626,224 B1     Page 1 of 1
DATED : September 30, 2003
INVENTOR(S) : Torstein Ljungmann It is certified that error appears in the above-identified patent and that said Letters Patent is hereby corrected as shown below:

<u>Title page, Item [54] and Column 1, lines 1-3,</u>
Title, please insert -- A -- before "MACHINE FOR AUTOMATICALLY ATTACHING COVER SLIPS TO MICROSCOPE SLIDES."

<u>Column 12,</u>
Line 8, after "at least one of said" please delete "motors," and insert
-- motors -- in its place.

Signed and Sealed this

Twenty-seventh Day of January, 2004

JON W. DUDAS
*Acting Director of the United States Patent and Trademark Office*